(12) United States Patent
Oshita et al.

(10) Patent No.: US 11,996,556 B2
(45) Date of Patent: May 28, 2024

(54) POSITIVE ELECTRODE ACTIVE MATERIAL FOR NON-AQUEOUS ELECTROLYTE SECONDARY BATTERY AND METHOD FOR PRODUCING THE SAME, POSITIVE ELECTRODE MIXTURE PASTE FOR NON-AQUEOUS ELECTROLYTE SECONDARY BATTERY, AND NON-AQUEOUS ELECTROLYTE SECONDARY BATTERY

(71) Applicant: SUMITOMO METAL MINING CO., LTD., Tokyo (JP)

(72) Inventors: Hiroko Oshita, Niihama (JP); Motoaki Saruwatari, Niihama (JP); Kazuomi Ryoshi, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 277 days.

(21) Appl. No.: 16/641,810

(22) PCT Filed: Aug. 23, 2018

(86) PCT No.: PCT/JP2018/031247
§ 371 (c)(1),
(2) Date: Feb. 25, 2020

(87) PCT Pub. No.: WO2019/039567
PCT Pub. Date: Feb. 28, 2019

(65) Prior Publication Data
US 2020/0358094 A1    Nov. 12, 2020

(30) Foreign Application Priority Data

Aug. 25, 2017    (JP) ................. 2017-162662

(51) Int. Cl.
*H01M 4/525*    (2010.01)
*H01M 4/02*    (2006.01)
(Continued)

(52) U.S. Cl.
CPC ......... *H01M 4/525* (2013.01); *H01M 4/0471* (2013.01); *H01M 4/131* (2013.01);
(Continued)

(58) Field of Classification Search
CPC .... H01M 4/131; H01M 4/1391; H01M 4/505; H01M 4/525
See application file for complete search history.

(56) References Cited

U.S. PATENT DOCUMENTS

2010/0047691 A1* 2/2010 Kawakami ............ H01M 4/485
429/224
2011/0315918 A1  12/2011 Kawai et al.
(Continued)

FOREIGN PATENT DOCUMENTS

CN    109997260 A    7/2019
JP    2004-335278 A   11/2004
(Continued)

OTHER PUBLICATIONS

International Preliminary Report on Patentability (Form PCT/IB/373) issued in counterpart International Application No. PCT/JP2018/031247 dated Feb. 25, 2020, with Form PCT/ISA/237, with English translation (19 pages).
(Continued)

*Primary Examiner* — Matthew T Martin
*Assistant Examiner* — Unique Jenevieve Luna
(74) *Attorney, Agent, or Firm* — WHDA, LLP

(57) ABSTRACT

An object is to provide a positive electrode active material for a non-aqueous electrolyte secondary battery that can suppress gelation of a positive electrode mixture paste and
(Continued)

can improve stability when a non-aqueous electrolyte secondary battery is manufactured. A positive electrode active material for a non-aqueous electrolyte secondary battery has a hexagonal layered crystal structure, is represented by general formula (1): $Li_{1+s}Ni_xCo_yMn_zM_wB_tO_{2+\alpha}$, and includes a lithium-metal composite oxide containing a secondary particle with a plurality of aggregated primary particles and a lithium-boron compound present on at least a part of surfaces of the primary particles. The amount of lithium hydroxide that elutes when the positive electrode active material is dispersed in water, measured by a neutralization titration method, is 0.01% by mass or more and 0.5% by mass or less with respect to the entire positive electrode active material.

13 Claims, 5 Drawing Sheets

(51) Int. Cl.
  *H01M 4/04* (2006.01)
  *H01M 4/131* (2010.01)
  *H01M 4/1391* (2010.01)
  *H01M 4/36* (2006.01)
  *H01M 4/505* (2010.01)
  *H01M 10/0525* (2010.01)

(52) U.S. Cl.
  CPC ......... *H01M 4/1391* (2013.01); *H01M 4/364* (2013.01); *H01M 4/366* (2013.01); *H01M 4/505* (2013.01); *H01M 10/0525* (2013.01); *H01M 2004/021* (2013.01); *H01M 2004/028* (2013.01)

(56) References Cited

U.S. PATENT DOCUMENTS

| | | | |
|---|---|---|---|
| 2013/0277604 | A1 | 10/2013 | Shimokita et al. |
| 2015/0108397 | A1 | 4/2015 | Takeoka et al. |
| 2016/0013476 | A1 | 1/2016 | Oh et al. |
| 2016/0118656 | A1 | 4/2016 | Nakayama et al. |
| 2016/0301063 | A1* | 10/2016 | Yukinobu ............. H01M 4/049 |
| 2017/0141441 | A1 | 5/2017 | Niina et al. |
| 2017/0187065 | A1* | 6/2017 | Inoue .................. C01G 53/006 |
| 2017/0317339 | A1 | 11/2017 | Shimokita et al. |
| 2018/0323428 | A1 | 11/2018 | Nakayama et al. |
| 2018/0351169 | A1 | 12/2018 | Oh et al. |
| 2019/0036112 | A1* | 1/2019 | Aida ..................... C01G 41/00 |
| 2019/0165360 | A1 | 5/2019 | Saruwatari et al. |
| 2019/0312279 | A1 | 10/2019 | Otsuka et al. |
| 2020/0127287 | A1 | 4/2020 | Yamauchi et al. |

FOREIGN PATENT DOCUMENTS

| | | | |
|---|---|---|---|
| JP | 2005-251716 A | 9/2005 | |
| JP | 2009-146739 A | 7/2009 | |
| JP | 2010-40382 A | 2/2010 | |
| JP | 2011-108554 A | 6/2011 | |
| JP | 2012-28313 A | 2/2012 | |
| JP | 2013-84395 A | 5/2013 | |
| JP | 2013-239434 A | 11/2013 | |
| JP | 2015-99767 A | 5/2015 | |
| JP | 2015-536558 A | 12/2015 | |
| WO | 2014/189108 A1 | 11/2014 | |
| WO | WO-2015072359 A1 * | 5/2015 | ............. C01G 53/42 |
| WO | WO-2015182595 A1 * | 12/2015 | ........... C01G 53/006 |
| WO | 2016/017073 A1 | 2/2016 | |
| WO | WO-2017073238 A1 * | 5/2017 | ............. C01G 41/00 |
| WO | 2017/199891 A1 | 11/2017 | |
| WO | 2018/043515 A1 | 3/2018 | |

OTHER PUBLICATIONS

International Search Report dated Nov. 27, 2018, issued in Application No. PCT/JP2018/031247, with English translation (5 pages).
Office Action dated Sep. 30, 2022, issued in counterpart CN Application No. 201880055180.X, with English Translation. (20 pages).

* cited by examiner

POSITIVE ELECTRODE ACTIVE MATERIAL FOR NON-AQUEOUS ELECTROLYTE SECONDARY BATTERY AND METHOD FOR PRODUCING THE SAME, POSITIVE ELECTRODE MIXTURE PASTE FOR NON-AQUEOUS ELECTROLYTE SECONDARY BATTERY, AND NON-AQUEOUS ELECTROLYTE SECONDARY BATTERY

TECHNICAL FIELD

The present invention relates to a positive electrode active material for a non-aqueous electrolyte secondary battery and a method for producing the same, a positive electrode mixture paste for a non-aqueous electrolyte secondary battery, and a non-aqueous electrolyte secondary battery.

BACKGROUND ART

In recent years, with widespread use of a portable electronic device such as a mobile phone or a notebook personal computer, development of a small and lightweight non-aqueous electrolyte secondary battery having high energy density has been strongly desired. In addition, development of a secondary battery having excellent output characteristics and charge and discharge cycle characteristics has been strongly desired as a battery for an electric car including a hybrid car.

As a secondary battery satisfying such requirements, there is a positive electrode active material for a non-aqueous electrolyte secondary battery. A typical secondary battery is a lithium ion secondary battery. This lithium ion secondary battery includes a negative electrode, a positive electrode, a non-aqueous electrolyte, and the like. As an active material of each of the negative electrode and the positive electrode, a material capable of insertion and de-insertion of lithium is used.

Such a lithium ion secondary battery is currently being actively studied and developed. Particularly, a lithium ion secondary battery using a layered or spinel type lithium-metal composite oxide as a positive electrode material can obtain a high voltage at a level of 4 V, and therefore has been put into practical use as a battery having a high energy density.

Examples of a typical material that has been proposed so far include a lithium-cobalt composite oxide ($LiCoO_2$) which is relatively easily synthesized, a lithium-metal composite oxide ($LiNiO_2$) using nickel which is cheaper than cobalt, a lithium nickel cobalt manganese composite oxide ($LiNi_{1/3}Co_{1/3}Mn_{1/3}O_2$), and a lithium-manganese composite oxide ($LiMn_2O_4$) using manganese.

In order to further improve charge and discharge cycle characteristics, for example, it is effective to add lithium in excess of a stoichiometric composition to a metal element such as nickel, cobalt, or manganese. Some proposals to improve battery characteristics by adding a compound containing boron or the like to a lithium nickel cobalt composite oxide have been made.

For example, Patent Literature 1 proposes a positive electrode active material for a non-aqueous electrolyte secondary battery, containing at least a lithium transition metal composite oxide having a layered structure, in which the lithium transition metal composite oxide is present in a form of particles formed of one or both of a primary particle and a secondary particle as an aggregate of the primary particles, the primary particles have an aspect ratio of 1 to 1.8, and at least surfaces of the particles include at least one selected from the group consisting of molybdenum, vanadium, tungsten, boron, and fluorine. According to Patent Literature 1, conductivity is improved by presence of a compound including at least one selected from the group consisting of molybdenum, vanadium, tungsten, boron, and fluorine on surfaces of the particles.

Patent Literature 2 proposes a lithium transition metal-based compound powder for a lithium secondary battery positive electrode material, containing a lithium transition metal-based compound capable of insertion and de-insertion of lithium ions as a main component, and formed by adding one compound containing at least one element selected from B and Bi and one compound containing at least one element selected from Mo, W, Nb, Ta, and Re together to the main component as a raw material, and then firing the resulting mixture. According to Patent Literature 2, additive elements are added together, and then the resulting mixture is fired to obtain a lithium transition metal-based compound powder formed of fine particles with suppressed grain growth and sintering, and a lithium-containing transition metal-based compound powder which has improved a rate and output characteristics and facilitates handling and preparation of an electrode can be obtained.

Patent Literature 3 proposes a positive electrode composition for a non-aqueous electrolyte solution secondary battery, containing a lithium-transition metal composite oxide represented by general formula $Li_aNi_{1-x-y}Co_xM^1_yW_zM^2_wO_2$ ($1.0 \leq a \leq 1.5$, $0 \leq x \leq 0.5$, $0 \leq y \leq 0.5$, $0.002 \leq z \leq 0.03$, $0 \leq w \leq 0.02$, $0 \leq x+y \leq 0.7$, $M^1$ is at least one selected from the group consisting of Mn and Al, and $M^2$ is at least one selected from the group consisting of Zr, Ti, Mg, Ta, Nb, and Mo) and a boron compound containing at least a boron element and an oxygen element. According to Patent Literature 3, by using a positive electrode composition containing a lithium-transition metal composite oxide essentially containing nickel and tungsten and a specific boron compound, output characteristics and cycle characteristics can be improved in the positive electrode composition using the lithium-transition metal composite oxide.

Patent Literature 4 proposes a positive electrode active material for a non-aqueous electrolyte solution secondary battery, containing at least a lithium-transition metal composite oxide having a layered crystal structure, in which the lithium-transition metal composite oxide is in a form of particles and contains lithium borate at least on surfaces of the particles. According to Patent Literature 4, by presence of lithium borate on surfaces of the particles, thermal stability can be improved while initial discharge capacity and initial efficiency are maintained at the same level.

Patent Literature 5 proposes a method for manufacturing a positive electrode active material, the method including: a step of coating composite oxide particles containing lithium (Li) and at least one of nickel (Ni) and cobalt (Co) with at least one of a sulfate and a boric acid compound, and a step of heating the composite oxide particles coated with at least one of the sulfate and the boric acid compound in an oxidizing atmosphere. According to Patent Literature 5, a positive electrode active material capable of achieving capacity enlargement of a secondary battery and an improvement in charge and discharge efficiency can be manufactured.

Patent Literature 6 proposes a positive electrode active material obtained by attaching a boric acid compound to composite oxide particles represented by $Li_aNi_xCo_yAl_zO_2$ (in which Ni can be replaced with one or more metal elements selected from the group consisting of Mn, Cr, Fe, V, Mg, Ti, Zr, Nb, Mo, W, Cu, Zn, Ga, In, Sn, La, and Ce within a range of 0.1 or less of Ni when the total amount of Ni is assumed to be 1. In the formula, a, x, y, and z are values within ranges of 0.3≤a≤1.05, 0.60<x<0.90, 0.10<y<0.40, and 0.01<z<0.20, and x, y, and z satisfy x+y+z=1.) as an average composition, and thermally treating the resulting product, in which the content of carbonate ions is 0.15% by weight or less, and the content of borate ions is 0.01% by weight or more and 5.0% by weight or less. According to Patent Literature 6, by attaching a boric acid compound, a carbonate radical contained in the composite oxide particles is replaced with the boric acid compound, and the amount of gas generated in a secondary battery can be reduced.

By the way, a positive electrode of a non-aqueous electrolyte secondary battery is formed, for example, by mixing a positive electrode active material with a binder such as polyvinylidene fluoride (PVDF) and a solvent such as N-methyl-2-pyrrolidone (NMP) to form a positive electrode mixture paste, and applying the positive electrode mixture paste to a current collector such as an aluminum foil. At this time, when lithium is released from the positive electrode active material in the positive electrode mixture paste, lithium may react with moisture contained in the binder or the like to generate lithium hydroxide. The generated lithium hydroxide may react with the binder to cause gelation of the positive electrode mixture paste. Gelation of the positive electrode mixture paste causes poor operability and reduction in yield. This tendency becomes significant when lithium in the positive electrode active material is in excess of a stoichiometric ratio and the ratio of nickel is high.

Some attempts have been made to suppress gelation of the positive electrode mixture paste. For example, Patent Literature 7 proposes a positive electrode composition for a non-aqueous electrolyte solution secondary battery, containing a positive electrode active material formed of a lithium-transition metal composite oxide and additive particles formed of acidic oxide particles. In this positive electrode composition, lithium hydroxide generated by a reaction between the positive electrode composition and moisture contained in a binder preferentially reacts with the acidic oxide. This suppresses a reaction between the generated lithium hydroxide and the binder to suppress gelation of a positive electrode mixture paste. The acidic oxide plays a role as a conductive material in the positive electrode, lowers resistance of the entire positive electrode, and contributes to improvement in output characteristics of the battery.

Patent Literature 8 proposes a method for producing a lithium ion secondary battery, the method including: preparing a lithium transition metal oxide containing LiOH outside the composition as a positive electrode active material; determining the molar amount P of LiOH contained in one gram of the positive electrode active material; preparing 0.05 mol or more of tungsten oxide in terms of tungsten atoms per mol of LiOH with respect to the molar amount P of LiOH; and kneading the positive electrode active material and the tungsten oxide with a conductive material and a binding agent using an organic solvent to prepare a positive electrode paste.

CITATION LIST

Patent Literature

Patent Literature 1: JP 2005-251716 A
Patent Literature 2: JP 2011-108554 A
Patent Literature 3: JP 2013-239434 A
Patent Literature 4: JP 2004-335278 A
Patent Literature 5: JP 2009-146739 A
Patent Literature 6: JP 2010-040382 A
Patent Literature 7: JP 2012-028313 A
Patent Literature 8: JP 2013-084395 A

SUMMARY OF INVENTION

Technical Problem

In all of the proposals described in Patent Literatures 1 to 6, battery characteristics such as output characteristics are improved. However, by adding boron, a problem of gelation of a positive electrode mixture paste may occur during manufacture of an electrode. Therefore, further improvement in gelation is desired with improvement in battery characteristics such as output characteristics and battery capacity.

In the proposal of Patent Literature 7, acidic oxide particles remain in a positive electrode composition. As a result, a separator may be damaged, and safety may be thereby lowered. Further improvement in suppression of gelation is required in a positive electrode mixture paste. Note that it is considered that suppression of gelation can be improved by increasing the addition amount of the acidic oxide, but battery capacity per unit mass may deteriorate due to an increase in raw material cost due to the increase in addition amount and an increase in the weight due to the addition.

Also in the proposal of Patent Literature 8, there is a risk of damage to a separator due to remaining tungsten oxide. Further improvement in suppression of gelation is required in a positive electrode mixture paste. Addition of tungsten which is a heavy element that does not contribute to charge and discharge may increase deterioration of battery capacity per unit weight.

In view of the above problems, an object of the present invention is to provide a positive electrode active material further improving battery capacity and output characteristics when the positive electrode active material is used in a non-aqueous electrolyte secondary battery, and suppressing gelation of a positive electrode mixture paste during manufacture of an electrode. In addition, an object of the present invention is to provide a method capable of producing such a positive electrode active material easily in industrial scale manufacture.

Solution to Problem

In order to solve the above problems, the present inventors have intensively studied on suppression of gelation of a positive electrode mixture paste for a non-aqueous electrolyte secondary battery. As a result, the present inventors have found that presence of a lithium-boron compound on surfaces of primary particles of lithium-metal composite oxide particles and reduction in the amount of lithium hydroxide present on the surfaces of the primary particles can achieve both improvement in output characteristics of a secondary battery using this positive electrode active material as a positive electrode and battery capacity thereof, and suppression of gelation of the positive electrode mixture paste, and has completed the present invention.

A first aspect of the present invention provides a positive electrode active material for a non-aqueous electrolyte secondary battery, having a hexagonal layered crystal structure, represented by general formula (1): $Li_{1+s}Ni_xCo_yMn_zM_wB_tO_{2+\alpha}$ (in formula (1), $-0.05 \leq s \leq 0.20$, $0.45 \leq x \leq 0.95$, $0 \leq y \leq 0.5$, $0 \leq z \leq 0.35$, $0 \leq w \leq 0.10$, $0.02 \leq t \leq 0.04$, $x+y+z+w=1$, $0 \leq \alpha \leq 0.2$, and M represents at least one element selected from V, Mg, Mo, Nb, Ti, W, and Al), the positive electrode active material comprising: a lithium-metal composite oxide containing a secondary particle with a plurality of aggregated primary particles; and a lithium-boron compound present on at least a part of surfaces of the primary particles, in which the amount of lithium hydroxide that elutes when the positive electrode active material is dispersed in water, measured by a neutralization titration method, is 0.01% by mass or more and 0.5% by mass or less with respect to the entire positive electrode active material, and the moisture content in the positive electrode active material is 0.1% by mass or less.

The positive electrode active material preferably has an average particle size of 3 μm or more and 25 μm or less. The positive electrode active material preferably has a Li occupancy of 97% or more by Rietveld analysis.

A second aspect of the present invention provides a method for producing a positive electrode active material for a non-aqueous electrolyte secondary battery, having a hexagonal layered crystal structure and represented by general formula (1): $Li_{1+s}Ni_xCo_yMn_zM_wBO_{2+\alpha}$ (in formula (1), $-0.05 \leq s \leq 0.20$, $0.45 \leq x \leq 0.95$, $0 \leq y \leq 0.5$, $0 \leq z \leq 0.35$, $0 \leq w \leq 0.10$, $0.02 \leq t \leq 0.04$, $x+y+z+w=1$, $0 \leq \alpha \leq 0.2$, and M represents at least one element selected from V, Mg, Mo, Nb, Ti, W, and Al), the method including: mixing a lithium-metal composite oxide represented by general formula (2): $Li_{1+s}Ni_xCo_yMn_zM_wO_{2+\alpha}$ (in formula (2), $-0.05 \leq s \leq 0.20$, $0.45 \leq x \leq 0.95$, $0 \leq y \leq 0.5$, $0 \leq z \leq 0.35$, $0 \leq w \leq 0.10$, $x+y+z+w=1$, $0 \leq a \leq 0.2$, and M satisfies at least one element selected from V, Mg, Mo, Nb, Ti, W, and Al) with a boron compound not containing lithium to obtain a boron mixture; and thermally treating the boron mixture at a temperature of 200° C. or higher and 300° C. or lower in an oxidizing atmosphere.

The amount of lithium hydroxide that elutes when the positive electrode active material obtained after the thermal treatment is dispersed in water, measured by a neutralization titration method, is preferably adjusted so as to be 0.01% by mass or more and 0.5% by mass or less with respect to the entire positive electrode active material. The boron compound is preferably at least one of boron oxide, ammonium borate, and an oxo acid of boron. The boron compound is preferably an orthoboric acid.

A third aspect of the present invention provides a positive electrode mixture paste for a non-aqueous electrolyte secondary battery, including the above positive electrode active material for a non-aqueous electrolyte secondary battery.

A fourth aspect of the present invention provides a non-aqueous electrolyte secondary battery including a positive electrode, a negative electrode, a separator, and a non-aqueous electrolyte, in which the positive electrode includes the above positive electrode active material for a non-aqueous electrolyte secondary battery.

Advantageous Effects of Invention

The present invention can provide a positive electrode active material further improving battery capacity and output characteristics when the positive electrode active material is used in a non-aqueous electrolyte secondary battery, suppressing gelation during manufacture of an electrode, and capable of obtaining a positive electrode mixture paste having high stability. Furthermore, a method for producing the positive electrode active material is easy and suitable for manufacture on an industrial scale, and industrial value thereof is extremely large.

DESCRIPTION OF EMBODIMENTS

Figure 1A:
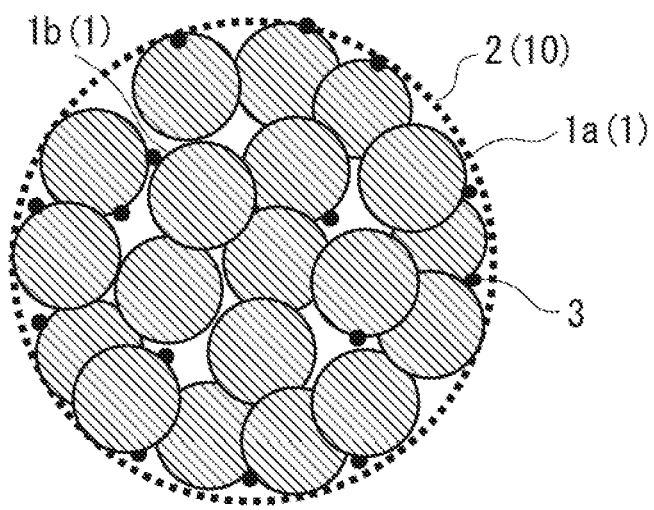
FIGS. 1A and 1B are diagrams illustrating an example of a positive electrode active material for a non-aqueous electrolyte secondary battery according to an embodiment.

Hereinafter, with reference to the drawings, a positive electrode active material for a non-aqueous electrolyte secondary battery according to an embodiment of the present invention and a method for producing the same, a positive electrode mixture paste for a non-aqueous electrolyte secondary battery, and a non-aqueous electrolyte secondary battery will be described. Note that in the drawings, in order to make it easy to understand each configuration, some parts are emphasized or simplified, and actual structures, shapes, scales, and the like may be different from those of the drawings.

Figure 1B:
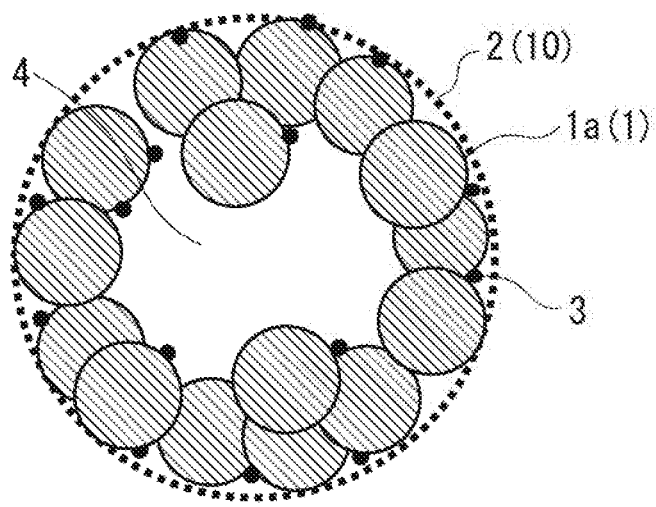
Figure 2:
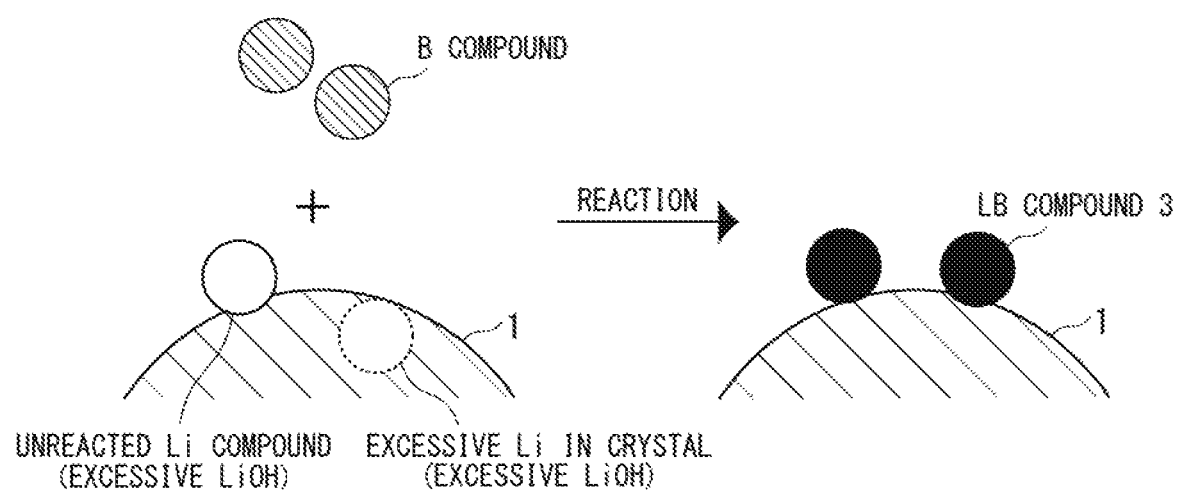
FIG. 2 is a diagram schematically illustrating a process of forming a lithium-boron compound.

1. Positive Electrode Active Material for Non-Aqueous Electrolyte Secondary Battery First, a positive electrode active material for anon-aqueous electrolyte secondary battery according to a first embodiment of the present invention (hereinafter also referred to as "positive electrode active material") will be described with reference to FIGS. 1A and 1B. FIGS. 1A and 1B schematically illustrate examples of a positive electrode active material according to the present embodiment, and FIG. 2 schematically illustrates a process of forming a lithium-boron compound according to the present embodiment.

A positive electrode active material 20 according to the present embodiment is represented by general formula (1): $Li_{1+s}Ni_xCo_yMn_zM_wB_tO_{2+\alpha}$ (in formula (1), $-0.05 \leq s \leq 0.20$, $0.45 \leq x \leq 0.95$, $0 \leq y \leq 0.5$, $0 \leq z \leq 0.35$, $0 \leq w \leq 0.10$, $0.02 \leq t \leq 0.04$, $x+y+z+w=1$, $0 \leq \alpha \leq 0.2$, and M represents at least one element selected from V, Mg, Mo, Nb, Ti, W, and Al), and has a hexagonal layered crystal structure. As illustrated in FIG. 1A, the positive electrode active material 20 comprises a lithium-metal composite oxide 10 and a lithium-boron compound 3 (hereinafter also referred to as "LB compound 3"), The lithium-metal composite oxide 10 includes a secondary particle 2 formed of aggregated primary particles 1, and the LB compound 3 is present at least on a part of a surface of the primary particle 1. In the positive electrode active material 20, the amount of excessive lithium hydroxide measured by a neutralization titration method is 0.01% by mass or more and 0.5% by mass or less with respect to the entire positive electrode active material 20, and the moisture content in the positive electrode active material 20 is 0.1% by mass or less.

By presence of the LB compound 3 on a surface of the primary particle 1, in a non-aqueous electrolyte secondary battery using the positive electrode active material 20, the positive electrode active material 20 can reduce reaction resistance of a positive electrode (hereinafter also referred to as "positive electrode resistance") and can improve initial charge capacity (hereinafter also referred to as "battery capacity"). By reducing the positive electrode resistance, a voltage lost in the secondary battery is reduced, and a voltage actually applied to a load side becomes relatively high. Therefore, a high output can be obtained. In addition, since the voltage applied to the load side is increased, lithium is sufficiently inserted into and extracted from the positive electrode. Therefore, it is considered that battery capacity is also improved.

Details of a mechanism by which the positive electrode resistance of the secondary battery using the positive electrode active material 20 is reduced are not clear. However, the LB compound 3 formed on surfaces of the primary particles 1 has high lithium ion conductivity and accelerates transfer of lithium ions. Therefore, by forming a lithium conduction path at an interface between an electrolyte solution and the positive electrode active material 20 in the positive electrode of the secondary battery, it is considered that the positive electrode resistance is reduced to improve output characteristics of the battery and battery capacity. The LB compound 3 has, for example, a form of lithium boron composite oxide.

The positive electrode active material 20 can suppress gelation of the positive electrode mixture paste. Usually, on a surface of a primary particle of the positive electrode active material, there is a water-soluble lithium compound containing lithium hydroxide (hereinafter collectively referred to as excessive lithium). When a secondary battery is manufactured, excessive lithium may elute into moisture contained in the positive electrode mixture paste (hereinafter also referred to as "paste") to raise the pH value of the paste, and the paste may be gelled.

Details of a mechanism by which the gelation of the paste is suppressed in the positive electrode active material 20 are not clear. However, boron which is one of the raw materials of the LB compound 3 reacts with excessive lithium present on surfaces of the primary particles in a lithium-metal composite oxide (base material) to form the LB compound 3 in a process of manufacturing the positive electrode active material 20. As a result, it is considered that the gel of the paste is suppressed.

FIG. 2 is a diagram schematically illustrating a process of forming the LB compound 3. In a process of manufacturing the positive electrode active material 20, as illustrated in FIG. 2, at least a part of excessive lithium hydroxide present on a surface of the primary particle 1 is caused to react with a boron compound (B compound) as a raw material to fix the formed LB compound 3 to the surface of the primary particle 1. Note that the study by the present inventors indicates that, for example, also by adding an acidic compound to a paste and neutralizing excessive lithium eluted into the paste, gelation of the paste can be suppressed, but when excessive lithium is neutralized after being eluted into the paste, an effect of suppressing gelation is not sufficient, and battery characteristics are deteriorated.

Note that the boron compound is considered to react also with lithium extracted from a crystal of a lithium-metal composite oxide (base material) in addition to the excessive lithium hydroxide on a surface of a primary particle of the lithium-metal composite oxide (base material). When the LB compound 3 is formed excessively, it is considered that the number of lithium ions that contribute to charge and discharge is decreased or crystallinity of the lithium-metal composite oxide (base material) is lowered to reduce battery capacity of a secondary battery.

The present inventors have found that 1) out of unreacted lithium (excessive lithium) and lithium eluted from the lithium-metal composite oxide (crystal), particularly, lithium eluted as lithium hydroxide (LiOH) when the positive electrode active material is dispersed in a solvent (hereinafter also collectively referred to as "excessive lithium hydroxide") contributes to gelation of the positive electrode mixture paste, and 2) it is important to control the elution amount of excessive lithium hydroxide into the positive electrode mixture paste within a specific range in the positive electrode active material 20 containing the LB compound 3 in order to suppress the gelation of the positive electrode mixture paste, as described later.

Here, for example, as illustrated in FIG. 1A, the surface of the primary particle 1 includes not only a surface of a primary particle 1a exposed to an outer surface (surface) of the secondary particle 2 but also a surface of a primary particle 1b exposed to the vicinity of the surface of the secondary particle 2 which an electrolyte solution can permeate through the outer surface (surface) of the secondary particle 2 and an internal void. Furthermore, even a grain boundary between the primary particles 1 is included if the primary particles 1 are not completely bonded and the electrolyte solution can permeate the primary particles 1. In addition, the surface of the primary particle 1 may include, for example, a surface of the primary particle 1 exposed to a hollow part 4 (void) in the secondary particle 2 as illustrated in FIG. 1B.

That is, since elution of excessive lithium (including excessive lithium hydroxide) occurs at a contact surface with the electrolyte solution, an unreacted lithium compound present on the contact surface with the electrolyte solution reacts with a boron compound, or excessive lithium in the metal composite oxide is extracted and reacts with the boron compound to form the LB compound 3 on a surface of the primary particle 1, thus suppressing elution of excessive lithium (including excessive lithium hydroxide). In addition, even if the LB compound 3 is partially formed on a surface of the primary particle, an effect of suppressing gelation can be obtained.

(Lithium-Boron Compound)

The LB compound 3 contains a Li atom and a B atom, and preferably contains lithium borate. Examples of the lithium borate include $LiB_2$, a hydrate thereof, $Li_3BO_3$, and a mixture thereof.

Presence of the LB compound 3 on a surface of the primary particle 1a exposed to a surface of the secondary particle 2 can be confirmed by, for example, X-ray photoelectron spectroscopy (XPS). Presence of boron on a surface of the primary particle 1b in the secondary particle 2 can be confirmed with, for example, a soft X-ray emission spectroscopy (SXES) attached to a field emission scanning electron microscope (FE-SEM). Note that it is difficult to directly confirm a presence form of a small amount of boron present in the secondary particle 2. However, lithium is considered as an element that forms a compound with boron. In addition, in consideration of the fact that at least a part of boron is present in the form of the LB compound 3 on a surface of the primary particle 1a exposed to the surface of the secondary particle 2, it is estimated that the LB compound 3 (for example, a lithium boron composite oxide) is formed also on the surface of the primary particle 1b in the secondary particle 2.

Note that a part of boron (B) in the positive electrode active material 20 may be solid-solved in a crystal of the lithium-metal composite oxide 10. However, if all the boron is solid-solved in the crystal of the lithium-metal composite oxide 10, an effect of reducing positive electrode resistance cannot be obtained. In addition, when boron is solid-solved in the lithium-metal composite oxide 10, battery capacity may be largely reduced.

(Amount of Excessive Lithium Hydroxide)

When the positive electrode active material 20 is dispersed in water, the amount of lithium hydroxide (amount of excessive lithium hydroxide) eluted is 0.5% by mass or less, preferably 0.1% by mass or less, and more preferably 0.05% by mass or less with respect to the entire positive electrode active material 20. When the amount of excessive lithium hydroxide is within the above range, gelation of the positive electrode mixture paste can be suppressed, and battery characteristics can be improved. Here, the entire positive electrode active material 20 means the total of the lithium-metal composite oxide 10, the LB compound 3, and a compound containing lithium (excessive lithium) other than a lithium-boron compound present on a surface of the primary particle 1.

Meanwhile, when the amount of excessive lithium hydroxide exceeds 0.5% by mass, an effect of suppressing gelation of the positive electrode mixture paste cannot be obtained. Details of this reason are not clear. However, it is considered that, for example, the LB compound 3 is excessively formed to increase excessive lithium hydroxide that causes gelation. A lower limit of the amount of excessive lithium hydroxide is, for example, 0.01% by mass or more with respect to the entire positive electrode active material 20.

Note that here, the amount of excessive lithium hydroxide refers to a value calculated by assuming that the entire amount of Li measured from the amount of an acid used up to the first neutralization point by neutralization titration out of a lithium compound eluted by dispersing the positive electrode active material 20 in water is derived from lithium hydroxide (LiOH). Note that when the positive electrode active material 20 is dispersed in water, at least a part of the LB compound 3 may be dissolved in a supernatant and neutralized in the same pH region as that of lithium hydroxide. Therefore, the amount of excessive lithium hydroxide includes the amount calculated as lithium hydroxide by elution of lithium contained in the LB compound 3.

Specifically, the amount of excessive lithium hydroxide can be measured by the following method. First, 15 g of the positive electrode active material is sufficiently dispersed in 75 ml of pure water, allowed to stand for 10 minutes. Thereafter, 10 ml of the supernatant is diluted with 50 ml of pure water to obtain an aqueous solution. Subsequently, the amount of Li eluted into the obtained aqueous solution is measured by a neutralization titration method using an acid such as hydrochloric acid. During neutralization titration, the pH of the aqueous solution obtained by diluting the supernatant falls in two stages. The first stage indicates a pH that falls due to neutralization of lithium hydroxide. Therefore, the amount of excessive lithium hydroxide is calculated by assuming that the entire amount of Li calculated from the amount of an acid used up to the first neutralization point by neutralization titration is derived from lithium hydroxide (LiOH).

The amount of excessive lithium hydroxide in the positive electrode active material 20 can be controlled within the above range, for example, by appropriately adjusting the amount of a boron compound added in a boron mixing step and thermal treatment temperature in a thermal treatment step in a process of manufacturing the positive electrode active material 20 described later. Note that the amount of excessive lithium hydroxide in the positive electrode active material 20 may increase as compared with a positive electrode active material not containing the LB compound 3. It is considered that this is because when the LB compound 3 is formed on a surface of the primary particle 1, a boron compound as a raw material reacts with lithium extracted from a crystal in the lithium-metal composite oxide (base material).

(Moisture Content of Positive Electrode Active Material)

The positive electrode active material 20 has a moisture content of 0.1% by mass or less. When the moisture content of the positive electrode active material 20 is within the above range, in a secondary battery using the positive electrode active material 20, positive electrode resistance can be reduced, and initial charge capacity can be improved. A lower limit of the moisture content of the positive electrode active material 20 is not particularly limited, but is, for example, 0.001% by mass or more. Note that the measured value of the moisture content is a measured value when being measured with a Karl Fischer moisture meter under a condition of a vaporization temperature of 300° C.

(Li Occupancy)

The positive electrode active material 20 has a hexagonal layered crystal structure. Crystallinity thereof can be evaluated, for example, with the length of a c-axis obtained by performing Rietveld analysis of an X-ray diffraction result, or a Li occupancy at a lithium site in the crystal (hereinafter also referred to as "Li occupancy").

The Li occupancy of the positive electrode active material 20 is preferably 97% or more, and more preferably 98% or more. When the Li occupancy is controlled within the above range, lithium deficiency at the lithium site is suppressed, and the crystallinity of the lithium-metal composite oxide 10 can be maintained at a high value. This makes it possible to improve output characteristic of an obtained secondary battery and to maintain high battery capacity.

(Composition of Positive Electrode Active Material)

The positive electrode active material 20 is represented by general formula (1): $Li_{1+s}Ni_xCo_yMn_zM_wB_tO_{2+\alpha}$ (in formula (1), $-0.05 \leq s \leq 0.20$, $0.45 \leq x \leq 0.95$, $0 \leq y \leq 0.5$, $0 \leq z \leq 0.35$, $0 \leq w \leq 0.10$, $0.02 \leq t \leq 0.04$, $x+y+z+w=1$, $0 \leq \alpha \leq 0.2$, and M represents at least one element selected from V, Mg, Mo, Nb, Ti, W, and Al). Note that the content of each element can be measured by ICP emission spectroscopy.

In the general formula (1), the range of t indicating the content of boron satisfies $0.02 \leq t \leq 0.04$. At least a part of boron is present as the LB compound 3 on a surface of the primary particle 1 as described above. In a case where t is within the above range, when the positive electrode active material 20 is used for a positive electrode of a secondary battery, an effect of reducing positive electrode resistance can be sufficiently obtained, high battery capacity can be obtained, and gelation of a positive electrode mixture paste can be suppressed. Meanwhile, in a case where t is less than 0.02, the effect of reducing the positive electrode resistance cannot be sufficiently obtained, and gelation of the positive electrode mixture paste cannot be suppressed. In a case where t exceeds 0.04, although the positive electrode resistance of the secondary battery is reduced, the battery capacity is drastically reduced, and the positive electrode mixture paste may be gelled. The range of t is preferably $0.025 \leq t \leq 0.04$ from a viewpoint of obtaining a higher effect of reducing the positive electrode resistance and higher battery capacity.

In the general formula (1), the range of s corresponding to the content of lithium is −0.05≤s≤0.20. That is, the content of lithium in the lithium-metal composite oxide 10 can be 95 atom % or more and 120 atom % or less with respect to the total amount of metal elements (excluding B) other than lithium. Note that, for example, the range of s may be less than 0.05 when the ratio of Ni in the positive electrode active material 20 is high. When s in the positive electrode active material 20 is within the above range, in a secondary battery using the positive electrode active material 20, high battery capacity and a further improved effect of reducing the positive electrode resistance can be obtained, and gelation of the positive electrode mixture paste can be suppressed.

In the general formula (1), x indicating the content of nickel satisfies 0.45≤x≤0.95, preferably 0.55≤x≤0.95. That is, the lithium-metal composite oxide 10 contains nickel as a metal element, and the content of nickel is 45 atom % or more and 95 atom % or less, and preferably 55 atom % or more and 95 atom % or less with respect to the total amount of metal elements (excluding B) other than lithium. The primary particle 1 constituting the lithium-metal composite oxide 10 has a crystal structure of a layered crystal structure (layered rock salt structure). When the content of nickel is within the above range, a secondary battery using the positive electrode active material 20 can achieve high battery capacity.

In the general formula (1), y indicating the content of cobalt satisfies 0≤y≤0.5, preferably 0.05≤y≤0.15. That is, in the lithium-metal composite oxide 10, the content of cobalt is 0 atom % or more and 50 atom % or less, and preferably 5 atom % or more and 15 atom % or less with respect to the total amount of metal elements (excluding B) other than lithium. When the content of cobalt is within the above range, stability of a high crystal structure and better cycle characteristics are achieved.

In the general formula (1), z indicating the content of manganese satisfies 0≤z≤0.35, preferably 0≤y≤0.15. That is, the content of manganese is 0 atom % or more and 35 atom % or less, and preferably 0 atom % or more and 15 atom % or less with respect to the total amount of metal elements (excluding B) other than lithium. When the content of manganese is within the above range, high thermal stability can be obtained.

Furthermore, in order to improve battery characteristics, as an additive element M, at least one element selected from V, Mg, Mo, Nb, Ti, W, and Al can be added. In this case, in the general formula (1), the content w of the additive element M preferably satisfies 0≤w≤0.1, in which x+y+z+w=1 is satisfied. For example, Al can be added as the additive element M.

(Average Particle Size of Positive Electrode Active Material)

The average particle size of the positive electrode active material 20 is preferably 3 μm or more and 25 μm or less, and more preferably 4 μm or more and 20 μm or less. When the average particle size of the positive electrode active material 20 is within the above range, an obtained secondary battery can further achieve a high filling property to a positive electrode in addition to the high output characteristics and high battery capacity. When the average particle size of the positive electrode active material 20 is less than 3 μm, a high filling property to a positive electrode cannot be obtained in some cases. When the average particle size exceeds 25 μm, high output characteristics and battery capacity cannot be obtained in some cases.

(Average Particle Size of Primary Particles)

The average particle size of the primary particles 1 is preferably 0.2 μm or more and 1.0 μm or less, and more preferably 0.3 μm or more and 0.7 μm or less. This makes it possible to obtain higher output characteristics and battery capacity, and higher cycle characteristics when the positive electrode active material 20 is used for a positive electrode of a battery. When the average particle size of the primary particles 1 is less than 0.2 μm, insufficient firing may occur, and sufficient battery performance cannot be obtained in some cases. When the average particle size exceeds 0.7 μm, high output characteristics and high cycle characteristics cannot be obtained in some cases. When the average particle size exceeds 0.7 μm, high output characteristics and battery capacity cannot be obtained in some cases.

(Structure of Positive Electrode Active Material)

Note that in the positive electrode active material 20, the secondary particle 2 may have a hollow structure including a hollow part 4 therein as illustrated in FIG. 1B, for example. When the secondary particle 2 has a hollow structure, an electrolyte can more easily enter the secondary particle 2, and high output characteristics can be obtained more easily. Note that one or more hollow parts 4 may be formed. The hollow structure also includes a porous structure having a large number of voids in the secondary particle 2.

Note that the positive electrode active material 20 includes the lithium-metal composite oxide 10 constituted by the secondary particle 2 formed of the plurality of aggregated primary particles 1, but for example, may include a small amount of primary particles 1 alone, such as primary particles 1 not aggregated as the secondary particle 2 or primary particles 1 that have dropped from the secondary particle 2 after aggregation. The positive electrode active material 20 may contain a lithium-metal composite oxide other than the lithium-metal composite oxide 10 described above as long as the effects of the present invention are not impaired.

2. Method for Producing Positive Electrode Active Material for Non-Aqueous Electrolyte Secondary Battery By a method for producing a positive electrode active material according to the present embodiment (hereinafter also referred to as "producing method"), a positive electrode active material for a non-aqueous electrolyte secondary battery, represented by general formula (1): $Li_{1+s}Ni_x Co_y Mn_z M_w B_t O_{2+\alpha}$ (in formula (1), −0.05≤s≤0.20, 0.45≤x≤0.95, 0≤y≤0.5, 0≤z≤0.35, 0≤w≤0.10, 0.02≤t≤0.04, x+y+z+w=1, 0≤α≤0.2, and M represents at least one element selected from V, Mg, Mo, Nb, Ti, W, and Al) and having a hexagonal layered crystal structure can be manufactured. By the producing method according to the present embodiment, the above-described positive electrode active material 20 can be easily manufactured on an industrial scale with high productivity.

Hereinafter, an example of the method for producing the positive electrode active material 20 according to the present embodiment will be described with reference to FIG. 3. Note that the following description is an example of the producing method, and the producing method is not limited to this method.

Figure 3:
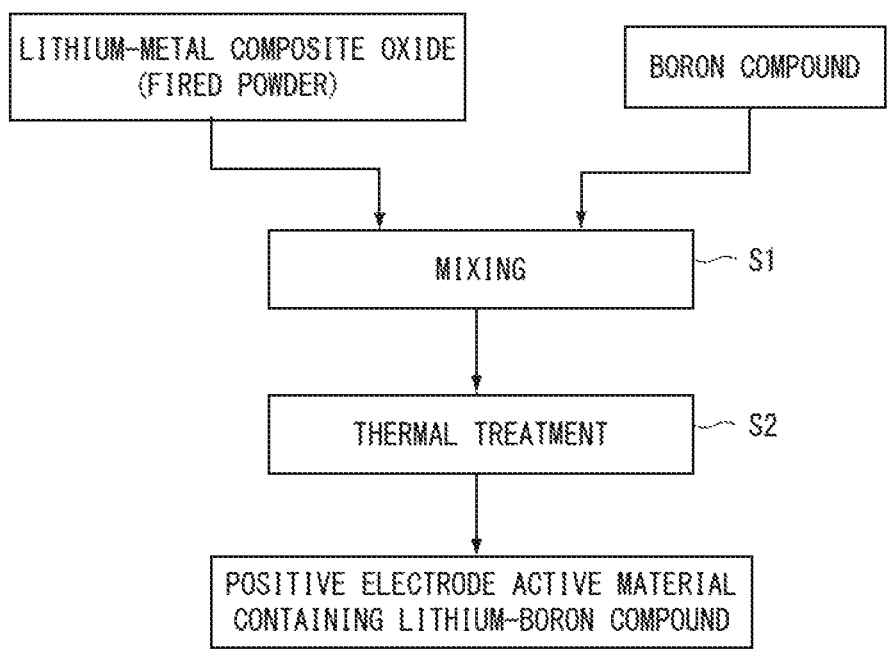
FIG. 3 is a diagram illustrating an example of a method for producing a positive electrode active material for a non-aqueous electrolyte secondary battery according to an embodiment.

As illustrated in FIG. 3, the producing method according to the present embodiment includes: mixing a lithium-metal composite oxide (fired powder) as a base material with a boron compound (B compound) not containing lithium (step S1); and thermally treating the mixture obtained by mixing (step S2). Hereinafter, each step will be described.

(Mixing Step: Step S1)

First, a fired powder (base material) formed of a lithium-metal composite oxide obtained by a known technique is mixed with a boron compound capable of reacting with lithium to obtain a boron mixture (step S1). At least a part of the boron compound reacts with lithium in particles of the lithium-metal composite oxide (base material) in a subsequent thermal treatment step (step S2) to form the LB compound 3 on a surface of the primary particle 1.

The lithium-metal composite oxide (base material) is represented by general formula (2): $Li_{1+s}Ni_xCo_yMn_zMO_{2+\alpha}$ (in the above formula (2), $-0.05 \le s \le 0.20$, $0.45 \le x \le 0.95$, $0 \le y \le 0.5$, $0 \le z \le 0.35$, $0 \le w \le 0.10$, $x+y+z+w=1$, $0 \le \alpha \le 0.2$, and M represents at least one element selected from V, Mg, Mo, Nb, Ti, W, and Al). The content ratio of each element in the base material can be within a similar content ratio range to the positive electrode active material 20 described above except for boron (B).

The content of boron in the boron mixture is substantially maintained even in the positive electrode active material 20 obtained after the thermal treatment step (step S2). Therefore, the boron compound only needs to be mixed in an amount corresponding to the target content of boron of the positive electrode active material 20, and is contained, for example, within a range of 2 at % or more and 4 at % or less with respect to the number of metal atoms in the lithium-metal composite oxide (base material). That is, in the general formula (1): $Li_{1+s}Ni_xCo_yMn_zM_wB_tO_{2+\alpha}$, by mixing the boron raw material such that the range of t indicating the content of boron (B) is $0.02 \le t \le 0.04$, both improvement of output characteristics and suppression of gelation of the positive electrode mixture paste can be achieved. When the boron raw material is mixed such that t exceeds 0.04, the amount of boron solid-solved in a crystal of the lithium-metal composite oxide 10 is too much, and the battery characteristics may be deteriorated.

The boron compound to be used is not particularly limited as long as being a raw material containing boron, but is preferably a boron raw material not containing lithium from a viewpoint of controlling an increase in the amount of excessive lithium and further suppressing gelation of the positive electrode mixture paste. As the boron compound, for example, a compound containing boron and oxygen can be used. In addition, the boron compound is preferably boron oxide, ammonium borate, an oxo acid of boron, or a mixture thereof, and is more preferably an orthoboric acid from a viewpoint of easy handling and excellent quality stability.

For mixing the lithium-metal composite oxide (base material) with the boron compound, a general mixer can be used, and examples thereof include a shaker mixer, a Loedige mixer, a Julia mixer, and a V blender. It is only required to perform mixing by sufficiently mixing the lithium-metal composite oxide (base material) with the boron compound to such an extent that the form of the lithium-metal composite oxide (base material) is not destroyed. In the firing step, in order to uniformly add boron in the lithium-metal composite oxide (base material), it is preferable to sufficiently mix the lithium-metal composite oxide (base material) with the boron compound such that the lithium-metal composite oxide and the boron compound are uniformly dispersed in the boron mixture.

(Thermal Treatment Step: Step S2)

Subsequently, the boron compound is thermally treated at a temperature of 200° C. or higher and 300° C. or lower in the atmosphere to obtain the positive electrode active material 20 (step S2). When the thermal treatment is performed within the above temperature range, the boron compound is caused to react with excessive lithium present on a surface of the primary particle of the base material to diffuse boron in the secondary particle 2, thus forming the LB compound 3 is formed on the surface of the primary particle 1. The obtained positive electrode active material 20 can reduce the positive electrode resistance of a secondary battery and suppress gelation of a positive electrode mixture paste.

Meanwhile, when the thermal treatment is performed at a temperature of lower than 200° C., the reaction between the boron compound and excessive lithium in the base material may be insufficient and an unreacted boron compound may remain, or formation of the LB compound 3 may be insufficient and the effect of reducing the positive electrode resistance as described above cannot be obtained in some cases. When the thermal treatment is performed at a temperature higher than 300° C., suppression of the gelation of the positive electrode mixture paste using the obtained positive electrode active material 20 may be insufficient, and the battery capacity of the secondary battery may be reduced. A reason for this is not particularly limited. However, for example, this is considered to be because boron reacts not only with excessive lithium on a surface of the primary particle but also excessively with lithium in a crystal of the primary particle 1, lithium in the primary particle 1 is extracted excessively, the number of lithium ions contributing to charge and discharge decreases, and the amount of excessive lithium on the surface of the primary particle 1 increases.

Thermal treatment time is appropriately adjusted according to the amount of excessive lithium formed. The thermal treatment time is, for example, five hours or more and 20 hours or less, and more preferably five hours or more and 10 hours or less. When the thermal treatment time is within the above range, the LB compound 3 can be sufficiently generated, and the output characteristics of the secondary battery can be further improved. Meanwhile, when the thermal treatment time is less than five hours, the LB compound 3 is not generated sufficiently in some cases. When the thermal treatment time exceeds 20 hours, lithium in a crystal of the lithium-metal composite oxide 10 may be excessively extracted.

The atmosphere during thermal treatment only needs to be an oxidizing atmosphere, but the oxygen concentration is preferably 18% by volume or more and 100% by volume or less. That is, the thermal treatment step is preferably performed in the atmosphere to an oxygen stream. When the oxygen concentration is less than 18% by volume, formation of the LB compound 3 is not sufficient in some cases. A furnace used for the thermal treatment may be similar to that used in the above firing step.

In the positive electrode active material 20 obtained in the present embodiment, the amount of excessive lithium hydroxide is 0.5% by mass or less, preferably 0.1% by mass or less, and more preferably 0.05% by mass or less with respect to the entire positive electrode active material 20. When the amount of excessive lithium hydroxide is within the above range, gelation of the positive electrode mixture paste can be suppressed. Here, the entire amount of the positive electrode active material means the total of the secondary particles 2 and the LB compound 3 constituting the lithium-metal composite oxide 10, and excessive lithium present on a surface of the primary particle 1. Note that a lower limit of the amount of excessive lithium hydroxide is preferably, for example, 0.01% by mass or more with respect to the total amount of the positive electrode active material.

Here, the amount of excessive lithium hydroxide in the positive electrode active material 20 varies depending on the composition of the lithium-metal composite oxide (fired powder) used as the base material, for example, the amount of the boron compound added in the boron mixing step (step S1). In the producing method according to the present embodiment, the amount of excessive lithium hydroxide in the obtained positive electrode active material 20 is preferably controlled within the above range by appropriately adjusting thermal treatment conditions (thermal treatment temperature, thermal treatment time, and the like) of the thermal treatment step (step S2).

Note that the amount of excessive lithium hydroxide in the lithium-metal composite oxide (base material) varies depending on a composition, a producing method, and the like, and is not particularly limited, but for example, may exceed 0.1% by mass, and may exceed 0.5% by mass with respect to the entire lithium-metal composite oxide (base material) from a viewpoint of sufficiently causing a reaction between a boron compound to be mixed in the mixing step (step S1) and lithium in the lithium-metal composite oxide (base material) to form the LB compound 3. In addition, the amount of excessive lithium hydroxide in the lithium-metal composite oxide (base material) is preferably larger than the amount of excessive lithium hydroxide in the positive electrode active material 20 obtained after the thermal treatment step (step S2). Note that the moisture content of the positive electrode active material 20 can be adjusted to 0.1% by mass or less, for example, by performing the thermal treatment step (step S2) described above, and no other step is required.

3. Positive Electrode Mixture Paste for Non-Aqueous Electrolyte Secondary Battery Next, a method for producing a positive electrode mixture paste for a non-aqueous electrolyte secondary battery according to the present embodiment (hereinafter also referred to as "positive electrode mixture paste") will be described. The positive electrode mixture paste according to the present embodiment includes the positive electrode active material 20. Therefore, elution of lithium from the positive electrode active material 20 is reduced in the positive electrode mixture paste, and gelation of the positive electrode mixture paste is suppressed. Therefore, even when the positive electrode mixture paste is stored for a long time, a change in viscosity of the positive electrode mixture paste is small, and the positive electrode mixture paste can have high stability. When a positive electrode is manufactured using such a positive electrode mixture paste, a positive electrode having stable and excellent characteristics can be obtained, and the characteristics of a secondary battery finally obtained can be stable and high.

A constituent material of the positive electrode mixture paste is not particularly limited, and a material equivalent to that of a known positive electrode mixture paste can be used. The positive electrode mixture paste includes, for example, the positive electrode active material 20, a conductive material, and a binder. The positive electrode mixture paste may further include a solvent. When the total mass of the solid content of the positive electrode mixture excluding the solvent is 100 mass parts, for example, the content of the positive electrode active material can be 60 to 95 mass parts, the content of the conductive material can be 1 to 20 mass parts, and the content of the binding agent can be 1 to 20 mass parts.

Examples of the conductive material include graphite (natural graphite, artificial graphite, expanded graphite, and the like), and a carbon black-based material such as acetylene black or ketjen black.

The binder (binding agent) plays a role of bonding active material particles together, and examples thereof include polyvinylidene fluoride (PVDF), polytetrafluoroethylene (PTFE), a fluorine-containing rubber, an ethylene propylene diene rubber, styrene butadiene, a cellulose-based resin, and polyacrylic acid.

Note that a conductive material and activated carbon may be dispersed in the positive electrode active material 20, and a solvent for dissolving the binder (binding agent) may be added thereto as necessary. As the solvent, specifically, an organic solvent such as N-methyl-2-pyrrolidone (NMP) can be used. Activated carbon can be added to the positive electrode mixture in order to increase electric double layer capacity. The positive electrode mixture paste can be manufactured, for example, by mixing the powdered positive electrode active material 20, the conductive material, and the binding agent, further adding activated carbon and a solvent for viscosity adjustment or the like as necessary, and kneading the resulting mixture.

4. Non-Aqueous Electrolyte Secondary Battery

Next, a non-aqueous electrolyte secondary battery according to the present embodiment will be described. The non-aqueous electrolyte secondary battery (hereinafter, also simply referred to as "secondary battery") according to the present embodiment is not particularly limited, and includes components similar to those of a known non-aqueous electrolyte secondary battery. The secondary battery may include, for example, a positive electrode, a negative electrode, a separator, and a non-aqueous electrolyte solution, or may include a positive electrode, a negative electrode, and a solid electrolyte. Note that an embodiment described below is merely an example, and the non-aqueous electrolyte secondary battery according to the present embodiment can be implemented in various modified forms or improved forms on the basis of knowledge of those skilled in the art on the basis of the embodiment described here. Use of the non-aqueous electrolyte secondary battery according to the present embodiment is not particularly limited.

(Positive Electrode)

Using the positive electrode mixture paste containing the positive electrode active material, for example, a positive electrode of a non-aqueous electrolyte secondary battery is manufactured as follows.

The positive electrode mixture paste is applied to, for example, a surface of an aluminum foil current collector and dried to scatter the solvent. Pressurization may be performed by roll press or the like in order to increase electrode density as necessary. In this way, a sheet-like positive electrode can be manufactured. The sheet-like positive electrode can be cut into an appropriate size or the like according to a target battery to be used for producing a battery. However, a method for producing the positive electrode is not limited to the exemplified one, and another method may be used.

(Negative Electrode)

For a negative electrode, metal lithium, a lithium alloy, or the like may be used. The negative electrode may be formed by mixing a binding agent with a negative electrode active material that can occlude and desorb lithium ions, adding an appropriate solvent thereto to form a paste-like negative electrode mixture, applying the paste-like negative electrode mixture to a surface of a metal foil current collector such as copper, drying the negative electrode mixture, and compressing the negative electrode mixture in order to increase the electrode density as necessary.

Examples of the negative electrode active material include natural graphite, artificial graphite, a fired organic compound such as a phenol resin, and a powdery carbon material such as coke. In this case, as a negative electrode binding agent, as in the positive electrode, a fluorine-containing resin such as PVDF can be used. As a solvent for dispersing the active material and the binding agent, an organic solvent such as N-methyl-2-pyrrolidone can be used.

(Separator)

A separator is interposed between the positive electrode and the negative electrode. The separator separates the positive electrode and the negative electrode from each other and retains an electrolyte, and a thin film formed of polyethylene, polypropylene, or the like and having many minute holes can be used.

(Non-Aqueous Electrolyte)

As the non-aqueous electrolyte, a non-aqueous electrolyte solution can be used. As the non-aqueous electrolyte solution, for example, a solution obtained by dissolving a lithium salt as a supporting salt in an organic solvent may be used. As the non-aqueous electrolyte solution, a solution obtained by dissolving a lithium salt in an ionic liquid may be used. Note that the ionic liquid refers to a salt including a cation other than a lithium ion and an anion, and being in a liquid state even at room temperature.

As the organic solvent, one selected from a cyclic carbonate such as ethylene carbonate, propylene carbonate, butylene carbonate, or trifluoropropylene carbonate, a chain carbonate such as diethyl carbonate, dimethyl carbonate, ethyl methyl carbonate, or dipropyl carbonate, an ether compound such as tetrahydrofuran, 2-methyltetrahydrofuran, or dimethoxyethane, a sulfur compound such as ethylmethylsulfone or butanesultone, and a phosphorus compound such as triethyl phosphate or trioctyl phosphate may be used singly, or two or more selected from these compounds may be mixed to be used.

Examples of the supporting salt include $LiPF_6$, $LiBF_4$, $LiClO_4$, $LiAsF_6$, $LiN(CF_3SO_2)_2$, and a composite salt thereof. Furthermore, the non-aqueous electrolyte solution may contain a radical scavenger, a surfactant, a flame retardant, and the like.

As the non-aqueous electrolyte, a solid electrolyte may be used. The solid electrolyte can withstand a high voltage. Examples of the solid electrolyte include an inorganic solid electrolyte and an organic solid electrolyte.

Examples of the inorganic solid electrolyte include an oxide-based solid electrolyte and a sulfide-based solid electrolyte.

The oxide-based solid electrolyte is not particularly limited, and any compound containing oxygen (O) and having lithium ion conductivity and electronic insulation can be used. Examples of the oxide-based solid electrolyte include lithium phosphate ($Li_3PO_4$), $Li_3PO_4N_x$, $LiBO_2N_x$, $LiNbO_3$, $LiTaO_3$, $Li_2SiO_3$, $Li_4SiO_4$—$Li_3PO_4$, $Li_4SiO_4$—$Li_3VO_4$, $Li_2O$—$B_2O_3$—$P_2O_5$, $Li_2O$—$SiO_2$, $Li_2O$—$B_2O_3$—$ZnO$, $Li_{1+x}Al_xTi_{2-x}(PO_4)_3$ (0≤X≤1), $Li_{1+x}Al_xGe_{2-x}(PO_4)_3$ (0≤X≤1), $LiTi_2(PO_4)_3$, $Li_{3x}La_{2/3-x}TiO_3$ (0≤X≤⅔), $Li_5La_3Ta_2O_{12}$, $Li_7La_3Zr_2O_{12}$, $Li_6BaLa_2Ta_2O_{12}$, and $Li_{3.6}Si_{0.6}P_{0.4}O_4$.

The sulfide-based solid electrolyte is not particularly limited, and any compound containing sulfur (S) and having lithium ion conductivity and electronic insulation can be used. Examples of the sulfide-based solid electrolyte include $Li_2S$—$P_2S$, $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, and $LiI$—$Li_3PO_4$—$P_2S_5$.

Note that as the inorganic solid electrolyte, compounds other than the compounds described above may be used. For example, $Li_3N$, $LiI$, or $Li_3N$—$LiI$—$LiOH$ may be used.

The organic solid electrolyte is not particularly limited as long as being a polymer compound exhibiting ionic conductivity, and examples thereof include polyethylene oxide, polypropylene oxide, and copolymers thereof. The organic solid electrolyte may contain a supporting salt (lithium salt).

(Shape of Battery and Configuration Thereof)

The non-aqueous electrolyte secondary battery according to the present embodiment, constituted by the positive electrode, the negative electrode, the separator, and the non-aqueous electrolyte solution described above can have various shapes such as a cylindrical shape and a laminated shape. Even when the non-aqueous electrolyte secondary battery has any shape, the positive electrode and the negative electrode are laminated via the separator to form an electrode body, the obtained electrode body is impregnated with the non-aqueous electrolyte solution, a positive electrode current collector is connected to a positive electrode terminal communicating with the outside using a current collecting lead or the like, a negative electrode current collector is connected to a negative electrode terminal communicating with the outside using a current collecting lead or the like, and the resulting product is sealed in a battery case to complete the non-aqueous electrolyte secondary battery.

(Characteristics)

A secondary battery using the positive electrode active material according to the present embodiment has high capacity and excellent gelation suppression. When a secondary battery using a positive electrode active material obtained in a preferred embodiment is used, for example, for a positive electrode of a 2032 type coin-type battery CBA (FIG. 4), high initial discharge capacity of 190 mAh/g or more, preferably 200 mAh/or more can be obtained. Note that the initial discharge capacity is a value obtained by measuring capacity when a coin-type battery CBA used in Example is left about 24 hours after manufacture thereof to stabilize an open circuit voltage (OCV), then the battery is charged to a cutoff voltage of 4.3 V at a current density of 0.1 $mA/cm^2$ with respect to the positive electrode, the battery pauses for one hour, and then the battery is discharged to a cutoff voltage of 3.0 V.

Figure 5:
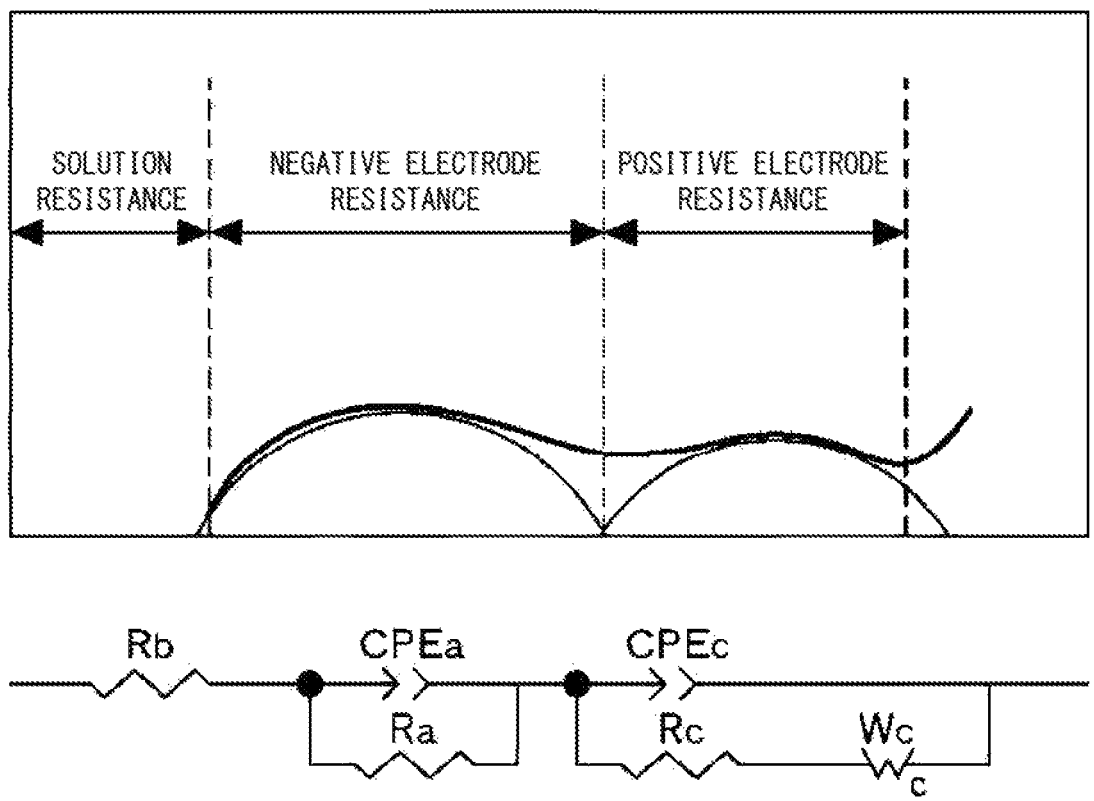
FIG. 5 is a schematic explanatory diagram of an impedance evaluation measurement example and an equivalent circuit used for analysis.

In the secondary battery using a positive electrode active material obtained in a preferred embodiment, for example, positive electrode resistance measured using the coin-type battery CBA can be 4Ω or less, preferably 3Ω or less, and more preferably 2.5Ω or less. Note that a method for measuring the positive electrode resistance in the present embodiment is exemplified as follows. When frequency dependence of a battery reaction is measured by a general AC impedance method as an electrochemical evaluation method, a Nyquist plot based on solution resistance, negative electrode resistance, negative electrode capacity, positive electrode resistance, and positive electrode capacity is obtained as illustrated in FIG. 5. The battery reaction at an electrode includes a resistance component accompanying a charge transfer and a capacity component due to an electric double layer. When these are expressed as an electric circuit, the electric circuit is a parallel circuit of resistance and capacity. The entire battery is represented by an equivalent circuit in which solution resistance and a parallel circuit of a negative electrode and a positive electrode are connected in series. Fitting calculation is performed on a Nyquist diagram obtained by measurement using this equivalent circuit, and each resistance component and each capacity component can be estimated. The positive electrode resistance is equal to the diameter of a semicircle on a low frequency side of the obtained Nyquist plot. Therefore, by performing AC impedance measurement on a manufactured secondary battery and performing fitting calculation on the obtained Nyquist diagram with an equivalent circuit, positive electrode resistance can be estimated.

EXAMPLES

Hereinafter, the present invention will be specifically described with reference to Examples of the present invention, but the present invention is never limited by these Examples. In the present Examples, samples of special grade reagents manufactured by Wako Pure Chemical Industries, Ltd. were used for manufacturing a composite hydroxide, a positive electrode active material, and a secondary battery. Note that an analysis method and an evaluation method for a positive electrode active material in each of Examples and Comparative examples are as follows.

(1) Analysis of composition: Measured by ICP emission spectrometry.

(2) Viscosity Stability of Positive Electrode Mixture Paste 25.0 g of a positive electrode active material, 1.5 g of carbon powder as a conductive material, 2.9 g of polyvinylidene fluoride (PVDF), and N-methyl-2-pyrrolidone (NMP) were mixed using a planetary motion kneader to obtain a positive electrode mixture paste. The addition amount of N-methyl-2-pyrrolidone (NMP) was adjusted by a viscosity measurement method using a vibration viscometer specified in JIS Z 8803: 2011 such that the viscosity was 1.5 to 2.5 Pa·s. The obtained positive electrode mixture paste was stored for 76 hours, and a gelation occurrence situation was visually evaluated. A case where gelation did not occur was evaluated as ○, and a case where gelation occurred was evaluated as x.

(3) Detection of Lithium-Boron Compound

A surface of the positive electrode active material was analyzed with XPS (Versa Probe II manufactured by ULVAC-PHI, Inc.). When a waveform indicating a combination with lithium was observed at a boron peak, it was determined that a lithium-boron compound (LB compound) was formed on the surface of the positive electrode active material (primary particle).

(4) Moisture Content

The moisture content was measured with a Karl Fischer moisture meter under conditions of a vaporization temperature of 300° C.

(5) Measurement of Amount of Excessive Lithium Hydroxide

The amount of excessive lithium hydroxide was measured by a neutralization titration method in which 15 g of the obtained positive electrode active material was dispersed in 75 ml of pure water, then the resulting solution was allowed to stand for 10 minutes, 10 ml of the supernatant was diluted with 50 ml of pure water, and 1 mol/liter hydrochloric acid was added thereto. In the neutralization titration, the pH of the supernatant aqueous solution decreased in two steps. It is assumed that a decrease in the first stage indicates the amount of excessive lithium hydroxide (first neutralization point), and the amount of eluted Li (amount of excessive lithium hydroxide) was calculated from the amount of hydrochloric acid up to the first neutralization point. Note that the amount of excessive lithium hydroxide was calculated by assuming that the whole amount of Li measured from the amount of hydrochloric acid up to the first neutralization point was derived from lithium hydroxide (LiOH).

(6) Manufacture of Battery and Evaluation Thereof

Figure 4:
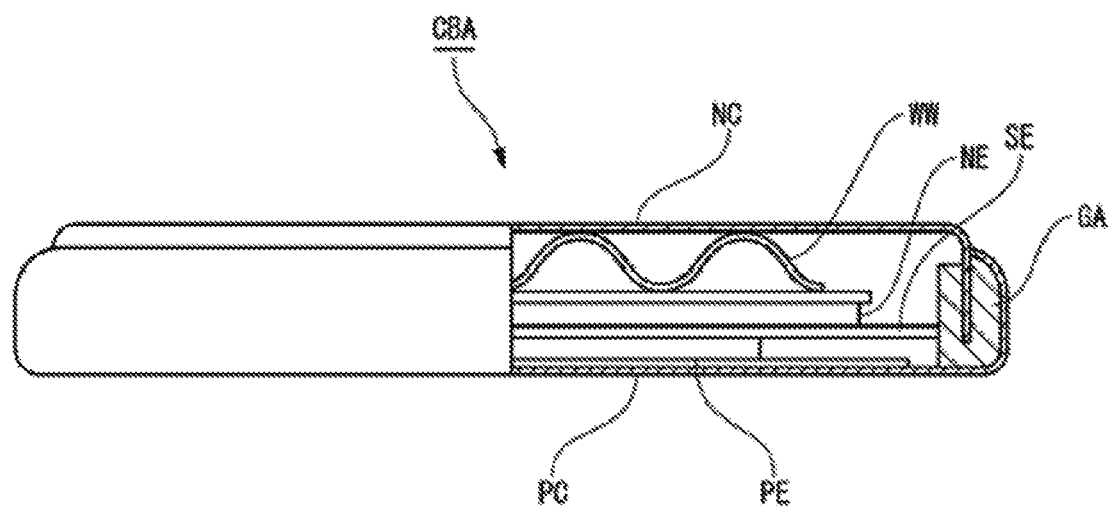
FIG. 4 is a schematic cross-sectional view of a coin-type battery used for battery evaluation.

Using the obtained positive electrode active material, a 2032 type coin-type battery CBA illustrated in FIG. 4 was manufactured, and battery characteristics were evaluated. Hereinafter, a method for manufacturing the coin-type battery CBA will be described.

52.5 mg of the obtained positive electrode active material, 15 mg of acetylene black, and 7.5 mg of polytetrafluoroethylene resin (PTFE) were mixed and press-molded so as to have a diameter of 11 mm and a thickness of 100 μm at a pressure of 100 MPa, thus manufacturing a positive electrode (electrode for evaluation) PE illustrated in FIG. 4. The manufactured positive electrode PE was dried in a vacuum dryer at 120° C. for 12 hours. Thereafter, using this positive electrode PE, a 2032 type coin-type battery CBA was manufactured in a glove box in an Ar atmosphere with a dew point controlled at −80° C. As a negative electrode NE, lithium (Li) metal (manufactured by KISCO Co., Ltd.) having a diameter of 17 mm and a thickness of 1 mm was used. As an electrolyte solution, an equal volume mixed solution of ethylene carbonate (EC) and diethyl carbonate (DEC) containing 1 M $LiClO_4$ as a supporting electrolyte (manufactured by Toyama Pharmaceutical Co., Ltd.) was used. As a separator SE, a polyethylene porous film having a thickness of 25 μm was used. The coin-type battery CBA included a gasket GA and a wave washer WW, and was assembled into a coin-shaped battery using a positive electrode can PC and a negative electrode can NC.

(Initial Discharge Capacity)

As initial discharge capacity, a volume obtained when the coin-type battery CBA was left about 24 hours after manufacture thereof to stabilize an open circuit voltage (OCV), then the battery was charged to a cutoff voltage of 4.3 V at a current density of 0.1 mA/cm² with respect to the positive electrode, the battery paused for one hour, and then the battery was discharged to a cutoff voltage of 3.0 V, was used. A multi-channel voltage/current generator (R6741A manufactured by Advantest Corporation) was used to measure discharge capacity.

(Positive Electrode Resistance)

When the coin-type battery CBA was charged at a charging potential of 4.1 V and measured by an AC impedance method using a frequency response analyzer and a potentiogalvanostat (1255B manufactured by Solartron), a Nyquist plot illustrated in FIG. 5 was obtained. The Nyquist plot is represented as the sum of characteristic curves indicating solution resistance, negative electrode resistance and capacity thereof, and positive electrode resistance and capacity thereof. Fitting calculation was performed using an equivalent circuit on the basis of the obtained Nyquist plot, and a value of the positive electrode resistance was calculated.

Example 1

Fired powder of lithium-metal composite oxide obtained by a known technique of mixing and firing hydroxide powder mainly containing Ni and lithium hydroxide, represented by $Li_{1.025}Ni_{0.88}Co_{0.09}Al_{0.03}O_2$, having an average particle size of 12.5 μm, and having [(d90−d10)/average particle size] of 0.80 was used as a base material. The lithium-metal composite oxide particles and orthoboric acid weighed such that t=0.03 was satisfied in general formula (1) indicating the composition of the positive electrode active material after a thermal treatment were sufficiently mixed using a shaker mixer (TURBULA Type T2C manufactured by Willy A. Bachofen (WAB)) to obtain a boron mixture. The boron mixture was held and thermally treated at 250° C. for 10 hours in an oxygen stream to obtain a positive electrode active material.

When the obtained positive electrode active material was analyzed with XPS (Versa Probe II manufactured by ULVAC-PHI, Inc.), a waveform indicating a combination with lithium was confirmed at a boron peak, and it was confirmed that a lithium-boron compound was present on a surface of a primary particle. Presence of boron in a secondary particle was analyzed with a soft X-ray emission spectroscopy (SXES) attached to an FE-SEM. As a result, a clear peak of boron was not observed at the center of the primary particle, but a peak indicating boron was observed at a grain boundary in the secondary particle (surface of the primary particle), and presence of boron was confirmed. Evaluation results of the obtained positive electrode active material are illustrated in Table 1.

Example 2

A positive electrode active material was obtained and evaluated in a similar manner to Example 1 except that the temperature of the thermal treatment after addition of orthoboric acid was 210° C. Evaluation results are illustrated in Table 1.

Example 3

A positive electrode active material was obtained and evaluated in a similar manner to Example 1 except that the temperature of the thermal treatment after addition of orthoboric acid was 290° C. Evaluation results are illustrated in Table 1.

Example 4

A positive electrode active material was obtained and evaluated in a similar manner to Example 1 except that orthoboric acid weighed such that t=0.02 was satisfied in general formula (1) indicating the positive electrode active material after the thermal treatment was mixed with the lithium-metal composite oxide. Evaluation results are illustrated in Table 1.

Example 5

A positive electrode active material was obtained and evaluated in a similar manner to Example 1 except that orthoboric acid weighed such that t=0.04 was satisfied in general formula (1) indicating the positive electrode active material after the thermal treatment was mixed with the lithium-metal composite oxide. Evaluation results are illustrated in Table 1.

Example 6

A positive electrode active material was obtained and evaluated in a similar manner to Example 1 except that as the fired powder (base material) formed of a lithium-metal composite oxide, a lithium-metal composite oxide represented by $Li_{1.030}Ni_{0.88}Co_{0.09}Mn_{0.03}O_2$, having an average particle size of 12.1 μm, and having [(d90−d10)/average particle size] of 0.85 was used. Evaluation results are illustrated in Table 1.

Comparative Example 1

A positive electrode active material was obtained and evaluated in a similar manner to Example 1 except that orthoboric acid was not added and the thermal treatment was not performed. Evaluation results are illustrated in Table 1.

Comparative Example 2

A positive electrode active material was obtained and evaluated in a similar manner to Example 1 except that the temperature of the thermal treatment after addition of orthoboric acid was 150° C. Evaluation results are illustrated in Table 1. When the obtained positive electrode active material was analyzed with XPS (Versa Probe II manufactured by ULVAC-PHI, Inc.), a waveform indicating a combination with lithium was not confirmed at a boron peak. From this result, it is considered that a boric acid compound containing lithium was not formed.

Comparative Example 3

A positive electrode active material was obtained and evaluated in a similar manner to Example 1 except that the temperature of the thermal treatment after addition of orthoboric acid was 350° C. Evaluation results are illustrated in Table 1.

Comparative Example 4

A positive electrode active material was obtained and evaluated in a similar manner to Example 1 except that orthoboric acid weighed such that t=0.01 was satisfied in general formula (1) indicating the positive electrode active material after the thermal treatment was mixed with the lithium-metal composite oxide (base material). Evaluation results are illustrated in Table 1.

Comparative Example 5

A positive electrode active material was obtained and evaluated in a similar manner to Example 1 except that orthoboric acid weighed such that t=0.05 was satisfied in general formula (1) indicating the positive electrode active material after the thermal treatment was mixed with the lithium-metal composite oxide (base material). Evaluation results are illustrated in Table 1.

Comparative Example 6

A positive electrode active material was obtained and evaluated in a similar manner to Example 6 except that orthoboric acid was not added and the thermal treatment was not performed. Evaluation results are illustrated in Table 1.

TABLE 1

| | Manufacturing conditions | | | | | | | Lithium-metal composite oxide Surface of primary particle LB compound |
|---|---|---|---|---|---|---|---|---|
| | Base material General Formula (2) $Li_{1+s}Ni_xCo_yMn_zM_wO_{2+\alpha}$ | | | | | Amount of boron added | Thermal treatment temperature | |
| | 1 + s | x | y | z | w = Al | t | ° C. | — |
| Example 1 | 1.025 | 0.88 | 0.09 | 0 | 0.03 | 0.03 | 250 | ○ |
| Example 2 | 1.025 | 0.88 | 0.09 | 0 | 0.03 | 0.03 | 210 | ○ |
| Example 3 | 1.023 | 0.88 | 0.09 | 0 | 0.03 | 0.03 | 290 | ○ |
| Example 4 | 1.025 | 0.88 | 0.09 | 0 | 0.03 | 0.02 | 250 | ○ |
| Example 5 | 1.025 | 0.88 | 0.09 | 0 | 0.03 | 0.04 | 250 | ○ |
| Example 6 | 1.030 | 0.88 | 0.09 | 0.03 | 0 | 0.03 | 250 | ○ |
| Comparative Example 1 | 1.025 | 0.88 | 0.09 | 0 | 0.03 | — | — | — |
| Comparative Example 2 | 1.025 | 0.88 | 0.09 | 0 | 0.03 | 0.03 | 150 | x |
| Comparative Example 3 | 1.025 | 0.88 | 0.09 | 0 | 0.03 | 0.03 | 350 | ○ |
| Comparative Example 4 | 1.025 | 0.88 | 0.09 | 0 | 0.03 | 0.01 | 250 | ○ |
| Comparative Example 5 | 1.025 | 0.88 | 0.09 | 0 | 0.03 | 0.05 | 250 | ○ |
| Comparative Example 6 | 1.030 | 0.88 | 0.09 | 0.03 | 0 | — | — | — |

| | Lithium-metal composite oxide | | | | | |
|---|---|---|---|---|---|---|
| | Surface of primary particle | | | Paste | Secondary battery | |
| | Amount of LiOH % by mass | Moisture content % by mass | Li occupancy % | Evaluation for gelation | Initial discharge capacity mAh·g⁻¹ | Positive electrode resistance Ω |
| Example 1 | 0.015 | 0.08 | 98.5 | ○ | 206.3 | 2.2 |
| Example 2 | 0.018 | 0.09 | 98.6 | ○ | 205.9 | 2.3 |
| Example 3 | 0.017 | 0.08 | 98.5 | ○ | 205.1 | 2.1 |
| Example 4 | 0.022 | 0.08 | 98.7 | ○ | 205.7 | 2.3 |
| Example 5 | 0.013 | 0.08 | 98.5 | ○ | 205.8 | 2.0 |
| Example 6 | 0.014 | 0.09 | 98.3 | ○ | 200.1 | 2.1 |
| Comparative Example 1 | 0.55 | 0.11 | 98.7 | x | 202.5 | 2.9 |
| Comparative Example 2 | 0.51 | 0.15 | 98.6 | x | 201.4 | 3.0 |
| Comparative Example 3 | 0.60 | 0.07 | 97.0 | x | 199.8 | 2.8 |
| Comparative Example 4 | 0.50 | 0.08 | 98.6 | x | 201.9 | 2.8 |
| Comparative Example 5 | 0.59 | 0.09 | 97.1 | x | 200.8 | 2.7 |
| Comparative Example 6 | 0.53 | 0.12 | 98.4 | x | 196.2 | 2.8 |

(Evaluation Results)

When each of the positive electrode active materials obtained in Examples 1 to 6 was used for a positive electrode of a secondary battery, positive electrode resistance was reduced, and high battery capacity was obtained as compared with the positive electrode active material of Comparative Example 1 or 6 not containing boron. In each of the positive electrode active materials obtained in Examples, gelation of a positive electrode mixture paste was suppressed.

In the positive electrode active material obtained at a thermal treatment temperature of 150° C. in Comparative Example 2, no lithium-boron compound was confirmed in the primary particle on a surface of the secondary particle, and gelation of the positive electrode mixture paste occurred. In the positive electrode active material obtained at a thermal treatment temperature of 350° C. in Comparative Example 3, the amount of excessive lithium hydroxide increased, and gelation of the positive electrode mixture paste occurred. Furthermore, since the thermal treatment temperature was high, extraction of lithium from the lithium-metal composite oxide increased, Li occupancy was reduced, and initial discharge capacity was reduced.

As illustrated in Comparative Example 4, when the amount of boron added was small, reduction in positive electrode resistance was small, and gelation of the positive electrode mixture paste occurred. Meanwhile, as illustrated in Comparative Example 5, when the amount of boron added was too large, although the positive electrode resistance was reduced, the amount of excessive lithium was increased, and gelation of the positive electrode mixture paste occurred. In addition, when the amount of boron added was large, extraction of lithium from the lithium-metal composite oxide increased, Li occupancy was reduced, and initial discharge capacity was reduced.

From the above results, it is clear that as the positive electrode active material according to the present embodiment, a positive electrode active material having good output characteristics and high battery capacity, and achieving suppression of gelation of a positive electrode mixture paste can be obtained by setting the thermal treatment temperature and the amount of a boron raw material added within an appropriate range.

Note that the technical scope of the present invention is not limited to the above embodiment. For example, one or more of the requirements described in the above embodiment may be omitted. The requirements described in the above embodiment can be combined as appropriate. To the extent permitted by law, the contents of Japanese Patent Application No. 2017-162662, which is a Japanese patent application, and all the Literatures cited in the above-described embodiment and the like are incorporated as part of the description of this text.

REFERENCE SIGNS LIST 1, 1a, 1b Primary particle
2 Secondary particle
3 Lithium-boron compound
10 Lithium-metal composite oxide
20 Positive electrode active material
CBA Coin-type battery
PE Positive electrode (electrode for evaluation)
NE Negative electrode
SE Separator
GA Gasket
WW Wave washer
PC Positive electrode can
NC Negative electrode can

The invention claimed is:

1. A positive electrode active material for a non-aqueous electrolyte secondary battery, having a hexagonal layered crystal structure and represented by general formula (1): $Li_{1+s}Ni_xCo_yMn_zM_wB_tO_{2+\alpha}$ (in the formula (1), $-0.05 \leq s \leq 0.20$, $0.45 \leq x \leq 0.95$, $0 \leq y \leq 0.5$, $0 \leq z \leq 0.35$, $0 \leq w \leq 0.10$, $0.02 \leq t \leq 0.04$, $x+y+z+w=1$, $0 \leq \alpha \leq 0.2$, and M represents at least one element selected from V, Mg, Nb, Ti, W, and Al),
the positive electrode active material comprising: a lithium-metal composite oxide containing a secondary particle with a plurality of aggregated primary particles and having voids in the secondary particle; and a lithium-boron compound present at least on a part of surfaces of the primary particles, the part of surfaces comprising the surfaces of the secondary particle and the surfaces of the voids in the secondary particle, wherein
an amount of lithium hydroxide that elutes when the positive electrode active material is dispersed in water, measured by a neutralization titration method, is 0.01% by mass or more and 0.5% by mass or less with respect to the entire positive electrode active material, and a moisture content in the positive electrode active material is 0.1% by mass or less, and
Li occupancy of the positive electrode active material is 98% or more and 100% or less.

2. The positive electrode active material for a non-aqueous electrolyte secondary battery according to claim 1, having an average particle size of 3 μm or more and 25 μm or less.

3. A method for manufacturing a positive electrode active material for a non-aqueous electrolyte secondary battery, having a hexagonal layered crystal structure and represented by general formula (1): $Li_{1+s}Ni_xCo_yMn_zM_wB_tO_{2+\alpha}$ (in the formula (1), $-0.05 \leq s \leq 0.20$, $0.45 \leq x \leq 0.95$, $0 \leq y \leq 0.5$, $0 \leq z \leq 0.35$, $0 \leq w \leq 0.10$, $0.02 \leq t \leq 0.04$, $x+y+z+w=1$, $0 \leq \alpha \leq 0.2$, and M represents at least one element selected from V, Mg, Nb, Ti, W, and Al),
the method comprising:
mixing a lithium-metal composite oxide represented by general formula (2): $Li_{1+s}Ni_xCo_yMn_zM_wO_{2+\alpha}$ (in the formula (2), $-0.05 \leq s \leq 0.20$, $0.45 \leq x \leq 0.95$, $0 \leq y \leq 0.5$, $0 \leq z \leq 0.35$, $0 \leq w \leq 0.10$, $x+y+z+w=1$, $0 \leq a \leq 0.2$, and M satisfies at least one element selected from V, Mg, Nb, Ti, W, and Al) with a solid form of a boron compound not containing lithium to obtain a boron mixture; and
thermally treating the boron mixture at a temperature of 200° C. or higher and lower than 300° C. in an oxidizing atmosphere, wherein
the lithium-metal composite oxide contains a secondary particle with a plurality of aggregated primary particles and has voids in the secondary particle, and
an amount of lithium hydroxide that elutes when the lithium-metal composite oxide after thermally treating is dispersed in water, measured by a neutralization titration method, is 0.01% by mass or more and 0.5% by mass or less with respect to the entire positive electrode active material.

4. The method for manufacturing a positive electrode active material for a non-aqueous electrolyte secondary battery according to claim 3, wherein an amount of lithium hydroxide that elutes when the positive electrode active material obtained after the thermal treatment is dispersed in water, measured by a neutralization titration method, is adjusted so as to be 0.01% by mass or more and 0.5% by mass or less with respect to the entire positive electrode active material.

5. The method for manufacturing a positive electrode active material for a non-aqueous electrolyte secondary battery according to claim 3, wherein the boron compound is at least one of boron oxide, ammonium borate, and an oxo acid of boron.

6. The method for manufacturing a positive electrode active material for a non-aqueous electrolyte secondary battery according to claim 3, wherein the boron compound is orthoboric acid.

7. A positive electrode mixture paste for a non-aqueous electrolyte secondary battery, comprising the positive electrode active material for a non-aqueous electrolyte secondary battery according to claim 1.

8. A non-aqueous electrolyte secondary battery comprising a positive electrode, a negative electrode, a separator, and a non-aqueous electrolyte, wherein the positive electrode includes the positive electrode active material for a non-aqueous electrolyte secondary battery according to claim 1.

9. The positive electrode active material for a non-aqueous electrolyte secondary battery according to claim 1, wherein the lithium-boron compound has been formed by thermal treatment at a temperature of 200° C. or higher and lower than 300° C. in which a solid form of a boron compound not containing lithium is reacted with an excessive lithium compound present on the surfaces of the primary particles of the lithium-metal composite oxide.

10. The positive electrode active material for a non-aqueous electrolyte secondary battery according to claim 1, wherein the lithium-boron compound is partially formed on the surfaces of the primary particles.

11. The positive electrode active material for a non-aqueous electrolyte secondary battery according to claim 9, wherein the lithium-boron compound is partially formed on the surfaces of the primary particles.

12. The method according to claim 3, wherein the lithium-metal composite oxide and the boron compound are mixed by a mixer.

13. The positive electrode active material for a non-aqueous electrolyte secondary battery according to claim 1, wherein $0.025 \leq t \leq 0.04$.

* * * * *